US009267611B2

(12) United States Patent
Sisk

(10) Patent No.: US 9,267,611 B2
(45) Date of Patent: Feb. 23, 2016

(54) MULTI-ANGLE BUTTERFLY VALVE EXTENSION ASSEMBLY

(71) Applicant: David E. Sisk, Bonne Terre, MO (US)

(72) Inventor: David E. Sisk, Bonne Terre, MO (US)

(73) Assignee: Bulk Tank Inc., Park Hills, MO (US)

( * ) Notice: Subject to any disclaimer, the term of this patent is extended or adjusted under 35 U.S.C. 154(b) by 40 days.

(21) Appl. No.: 13/998,897

(22) Filed: Dec. 19, 2013

(65) Prior Publication Data

US 2014/0103241 A1    Apr. 17, 2014

Related U.S. Application Data

(63) Continuation-in-part of application No. 13/506,246, filed on Apr. 6, 2012, now Pat. No. 8,807,529.

(60) Provisional application No. 61/517,200, filed on Apr. 18, 2011.

(51) Int. Cl.
    *F16K 31/60*    (2006.01)
    *F16K 1/22*     (2006.01)
    *F16K 31/46*    (2006.01)

(52) U.S. Cl.
    CPC ................ *F16K 31/60* (2013.01); *F16K 1/221* (2013.01); *F16K 31/46* (2013.01)

(58) Field of Classification Search
    CPC .......... F16K 31/46; F16K 31/60; F16K 1/221
    USPC .................... 251/221, 292–293, 308
    See application file for complete search history.

(56) References Cited

U.S. PATENT DOCUMENTS

| 300,501 | A | * | 6/1884 | Payne ........................... 251/293 |
| 1,155,871 | A | * | 10/1915 | Bauer ......................... 123/179.9 |
| 1,183,343 | A | | 5/1916 | Chalupa |
| 1,603,455 | A | | 10/1926 | Dow |
| 1,627,458 | A | * | 5/1927 | Pritchett ....................... 251/287 |
| 2,780,369 | A | | 2/1957 | Kaney |
| 3,100,500 | A | | 8/1963 | Stillwagon |
| 3,334,650 | A | | 8/1967 | Lowrey et al. |
| 3,452,766 | A | | 7/1969 | Fenster |
| 3,549,123 | A | | 12/1970 | Bell |
| 3,778,028 | A | | 12/1973 | Graves et al. |
| 3,904,173 | A | | 9/1975 | Naylor |
| 4,093,180 | A | | 6/1978 | Strabala |
| 4,157,019 | A | * | 6/1979 | Von Allworden ............. 464/175 |
| 4,176,675 | A | | 12/1979 | Liberman |
| 4,289,163 | A | | 9/1981 | Pierson |
| 4,495,963 | A | * | 1/1985 | Hensley ........................ 137/351 |
| 4,747,427 | A | | 5/1988 | Smith et al. |
| 4,756,507 | A | | 7/1988 | McAndrew |
| 4,848,396 | A | | 7/1989 | Sisk |
| 5,269,492 | A | | 12/1993 | McLennan |
| 5,356,116 | A | | 10/1994 | Morgan et al. |
| 5,360,030 | A | | 11/1994 | Sisk |
| 5,411,048 | A | | 5/1995 | Massey |
| 5,482,251 | A | | 1/1996 | Roberts |
| 5,598,724 | A | | 2/1997 | Primeau |
| 5,711,511 | A | * | 1/1998 | Cynar ........................... 251/293 |
| D397,767 | S | | 9/1998 | Gustafsson |

(Continued)

*Primary Examiner* — Marina Tietjen
(74) *Attorney, Agent, or Firm* — Paul M. Denk

(57) ABSTRACT

A multi-angle butterfly valve extension assembly is disclosed which comprises a universal joint for attachment to a stem of a butterfly valve, a shaft having a first end and a second end, the first end being connected to the universal joint, and an extension housing for supporting the shaft with the second end of the shaft extending out of the extension housing.

5 Claims, 3 Drawing Sheets

(56) References Cited

U.S. PATENT DOCUMENTS

| | | |
|---|---|---|
| 5,842,681 A | 12/1998 | Sisk |
| 5,904,356 A * | 5/1999 | Mundy .................. 277/431 |
| D412,966 S | 8/1999 | Albea |
| D420,099 S | 2/2000 | Lewis et al. |
| D433,482 S | 11/2000 | Beaver et al. |
| 6,148,851 A | 11/2000 | Friedline et al. |
| 6,257,551 B1 | 7/2001 | Veiga |
| 6,260,932 B1 | 7/2001 | Tinklepaugh |
| 6,607,177 B2 | 8/2003 | Burian et al. |
| 6,616,123 B2 | 9/2003 | Burian et al. |
| 6,786,362 B2 | 9/2004 | Sisk |
| 6,959,914 B1 * | 11/2005 | Corral .......................... 251/293 |
| 7,207,500 B2 | 4/2007 | Hudson et al. |
| 7,669,833 B2 | 3/2010 | Marcoz |
| D625,390 S | 10/2010 | Ambrosi |
| D678,471 S | 3/2013 | Sisk |
| D678,472 S | 3/2013 | Sisk |
| D678,473 S | 3/2013 | Sisk |
| D703,788 S * | 4/2014 | Sisk ............................ D23/233 |
| 2004/0227013 A1 | 11/2004 | Byron et al. |
| 2007/0209216 A1 | 9/2007 | Accumanno |
| 2012/0241657 A1 | 9/2012 | Sisk |
| 2014/0264119 A1 * | 9/2014 | Abu-Shaikha ................ 251/213 |

* cited by examiner

US 9,267,611 B2

MULTI-ANGLE BUTTERFLY VALVE EXTENSION ASSEMBLY

CROSS REFERENCE TO RELATED APPLICATION

This continuation-in-part patent application claims priority to the non-provisional patent application having Ser. No. 13/506,246, filed on Apr. 6, 2012, which claims priority to the provisional patent application having Ser. No. 61/517,200, filed on Apr. 18, 2011; which is a continuation-in-part of the U.S. design patent application having Ser. No. 29/372,801, filed on Jan. 13, 2011; which is also a continuation-in-part of the U.S. design patent application having Ser. No. 29/372,802, filed on Jan. 13, 2011; and, which is a continuation-in-part of the design patent application having Ser. No. 29/372,803, filed on Jan. 13, 2011, which this application is also a continuation-in-part application of U.S. design patent application having Ser. No. 13/506,244, filed on Apr. 6, 2012, which claims priority to the provisional patent application having Ser. No. 61/517,041, filed on Apr. 12, 2011, and which this application is also a continuation-in-part of U.S. design patent application having Ser. No. 29/421,924, filed on Oct. 19, 2012, all of said applications being owned by a common assignee.

FIELD OF THE INVENTION

This disclosure relates to a device for operating a butterfly valve of the type associated with a hopper tee positioned on a bottom of a bulk commodity tank or storage container for use in unloading contents of the tank or storage container, and more particularly, to a multi-angle butterfly valve extension assembly for controlling operation of the butterfly valve from a position remote from the butterfly valve. This disclosure also relates to a multi-angle extension to a butterfly valve, that is normally manually manipulated, that is positioned where it can be conveniently turned by the operator between its closed and discharging positions. In other words, this disclosure greatly facilitates the ability of one to manipulate a butterfly valve during its usage from a convenient position and location.

BACKGROUND OF THE INVENTION

Hoppers and tank trailers have been commonly used to transport bulk commodities such as granular product or dry bulk material, including industrial products and food products. The hoppers may include multiple sections or compartments for receiving and holding the commodities, with each section or compartment having a generally conical or tapered bottom portion terminating at a discharge outlet. A discharge valve, such as a butterfly valve, is typically provided at the discharge outlet and when opened will allow the commodities to flow out of the tank trailer.

When the hopper or the tank trailer reaches its destination, the bulk commodity will be unloaded by use of a pressurized air system. Typically, this is accomplished by connecting tee assemblies for unloading and then initiating the pneumatic unloading of the bulk commodity from the hopper into a clean and sanitary pipe line. In this manner, the tee assemblies are connected at opposite ends thereof to generally horizontal pipes or hoses that are connected, in turn, to the hopper tees of other sections or compartments. These connections establish a generally horizontal path through the hopper tees and connected pipes or hoses for the flow of the materials discharged from the hopper sections or compartments.

Actual transfer of the bulk commodity that has been transported in the hopper is then accomplished by opening the discharge or dump valve, typically a butterfly valve, associated with the discharge outlet at the bottom of the hopper. Once the valve is opened, the bulk commodity material is moved out of the hopper by gravity flow or by air pressure vibration into and through the vertical section of the hopper tee. As the bulk commodity material drains through the vertical section of the hopper tee into the horizontal portion of the hopper tee, the material is directionally directed by air conveyance through the horizontal portion by a pressure differential in the pipe to cause the material to be directed to and discharged to a desired receptacle or area.

The butterfly valve is generally configured to be manually operated by a rotatable valve stem that projects generally outwardly and generally horizontally near the top of the vertical section of the hopper tee. The valve stem may be engaged by a valve handle so as to be rotated by the operation of the valve handle to open and close the valve. Typically, the projecting portion of the valve stem has been formed or machined at its outer end to have a non-circular cross-section so as to be easily engaged by a similarly configured socket portion associated with the valve handle.

Because the discharge valve for the hopper is positioned at the bottom of the hopper, access to the valve for purposes of opening and closing the valve is often inconvenient. Due to the limited ground clearance height of the valve and the valve being generally centered below the hopper, the valve is difficult to easily reach. Further, a valve handle device must frequently be employed by an operator to assist in actuating the discharge valve. Use of the valve handle device puts the operator in awkward or less than desirable position. Consequently, over the years, it has become desirable, if not customary, for valve handle devices to be constructed from aluminum or other lighter weight materials so as to lessen the strain on the operator as the operator attempts to handle and utilize the valve handle device in awkward positions.

The butterfly valve is used at the base of tank trailers, or even railroad cars, as a means to prevent the untimely discharge of the conveying cargo, whether it is grains, polymer beads, or other flowable materials. The butterfly valve may be manipulated into an open position to provide for the prompt discharge of material from the tank trailer or hopper. Usually, in order to gain access to the butterfly valve to operate the valve, the operator of the vehicle was required to climb under the tank trailer and in the early days, apply a wrench to the butterfly valve shaft, and forcefully turn it at least a quarter turn, in order to provide for opening or closing of the valve, during its manipulation and operation. The problem with such structure was its accessibility, because the operator was required to crawl deeply under the vehicle, to obtain access to the shaft, and to attain its manipulation, during usage. During inclement weather, obviously, this is a dirty task, but, regardless of the weather, it was still predominantly a difficult task. Also, the butterfly valve is in close proximity to hot air supply lines that can reach temperatures of 350° F. If caution is not exercised, it is possible that the operator may be burned by coming into contact with the hot air supply lines.

Consequently, there has existed a need for an improved butterfly valve extension assembly that can be more easily operated by a user without encountering undue interference with other equipment or piping at the bottom on the hopper. It would also be desirable to avoid any potentially hazardous conditions such as coming into contact with hot air lines or being near a tremendous amount of material being discharged. It would also be advantageous to provide a multi-angle butterfly valve extension assembly that is designed to enhance the safety and convenience of the vehicle operator, and to facilitate easy manipulation of a butterfly valve when unloading of a tank trailer.

SUMMARY OF THE INVENTION

The present disclosure contemplates a multi-angle butterfly valve extension assembly that comprises a universal joint for attachment to a stem of a butterfly valve, a shaft having a first end and a second end, the first end being connected to the universal joint, and an extension housing for supporting the shaft with the second end of the shaft extending out of the extension housing.

The present disclosure is directed to a multi-angle butterfly valve extension assembly that comprises a universal joint for attachment to a stem of a butterfly valve, movement of the universal joint for turning the stem to open or close the butterfly valve, a shaft member having a first end and a second end, the first end being connected to the universal joint, and a universal joint for attachment to a stem of a butterfly valve, movement of the universal joint for turning the stem to open or close the butterfly valve, a shaft member having a first end and a second end, the first end being connected to the universal joint, and an extension housing for supporting the shaft and the second end extending out of the extension housing, the second end having a configuration for accepting a handle with the handle assisting in moving the second end, the shaft, the first end, and the universal joint to open or close the butterfly valve.

In another embodiment, a multi-angle butterfly valve extension assembly comprises a butterfly valve having a housing having a back end having a flange and a rotatable stem extending out from the flange, the stem for opening or closing the butterfly valve, a universal joint for attachment to the stem of the butterfly valve, movement of the universal joint for turning the stem to open or close the butterfly valve, a shaft member having a first end and a second end, the first end being pivotally connected to the universal joint, an extension housing for supporting the shaft and the second end extending out of the extension housing, and a handle for engagement with the second end with the handle for assisting in moving the second end, the shaft, the first end, and the universal joint to open and close the butterfly valve.

It should be recognized that the present disclosure provides a multi-angle butterfly valve extension assembly that provides for remote operation of a butterfly valve.

The present disclosure is also directed to a multi-angle butterfly valve extension assembly that can be positioned at a desired angular orientation relative to a tank trailer or a butterfly valve.

The present disclosure provides a multi-angle butterfly valve extension assembly that is easy to operate with use of a handle.

The present disclosure also provides a multi-angle butterfly valve extension assembly that provides a more convenient position to secure a handle for operating or maneuvering a butterfly valve between loading and unloading positions.

The present disclosure is further directed to a multi-angle butterfly valve extension assembly that has a shaft of varying lengths that may be secured to a tank trailer and placed for operation of the butterfly valve remotely from the butterfly valve.

The present disclosure also provides a multi-angle butterfly valve extension assembly that can be used without encountering interference with swing-away hopper tee assemblies that are now frequently utilized with hoppers.

The present disclosure is directed to a multi-angle butterfly valve extension assembly that makes it far more convenient and safer to use a handle to operate a butterfly valve between a loading and unloading position.

The present disclosure is also directed to a multi-angle butterfly valve extension assembly that provides greater clearance from the tank trailer operating structures in the vicinity of the butterfly valve, through the usage of a universal joint, a shaft, and an extension housing that are structured to furnish clearance to other components associated with a tank trailer.

The present disclosure is further directed to a multi-angle butterfly valve extension assembly that may be lubricated to maintain and extend the life of the extension assembly.

These and other advantages of the present disclosure will become apparent to those skilled in the art after considering the following detailed specification in conjunction with the accompanying drawings.

DESCRIPTION OF THE PREFERRED EMBODIMENT

Figure 1:
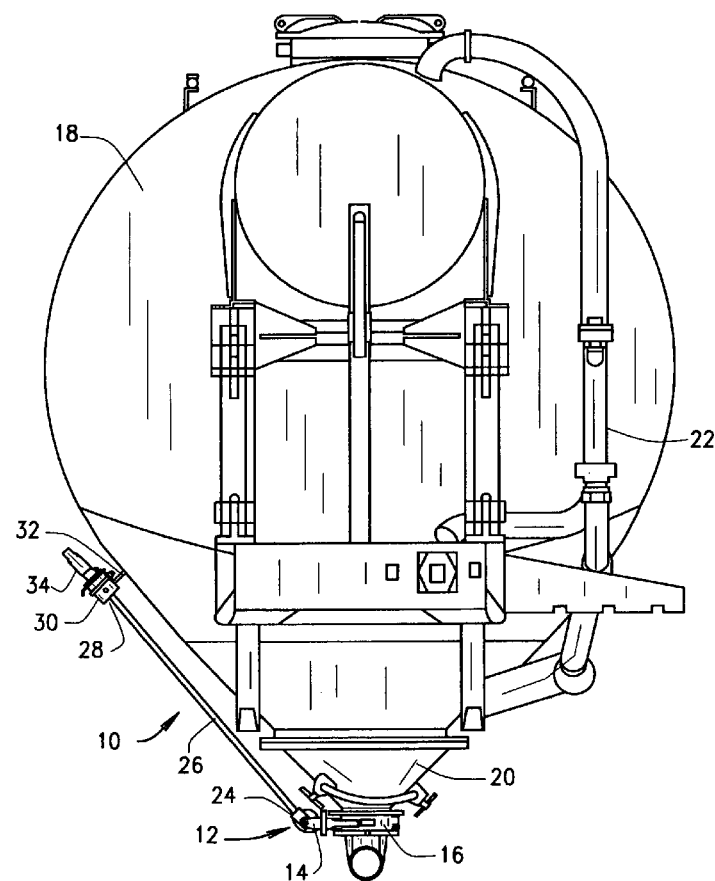
FIG. 1 is a perspective view of a multi-angle butterfly valve extension assembly constructed according to the present disclosure installed on a tank trailer.

Referring now to the drawings, wherein like numbers refer to like items, number 10 identifies a preferred embodiment of a multi-angle butterfly valve extension assembly constructed according to the present disclosure. With reference now to FIG. 1, the extension assembly 10 comprises a universal joint 12 attached to a valve stem 14 of a butterfly valve 16. The butterfly valve 16 may be opened by operation of the valve stem 14 to allow the contents (not shown) of a tank trailer 18 to be unloaded from the tank trailer 18 through a hopper 20 with the use of a pressurized air piping system 22. The universal joint 12 is connected to a first end 24 of a stem or shaft 26. The universal joint 12 is used to position, pivot, or angle the shaft 26 away from the tank trailer 18 at a desired angle or orientation. For example, the angle may range from 0° to 45° depending upon the configuration of the tank trailer 18. The shaft 26 has a second end 28 which is supported within an extension housing 30. The shaft 26 may have any length for positioning the second end 28 away from the butterfly valve 16. The extension housing 30 is attached to a bracket 32 which is connected to the tank trailer 18. The second end 28 extends out of the extension housing 30 and a handle 34 may be placed on the second end 28 to assist in rotating the second end 28, the shaft 26, the first end 24, and the valve stem 14 of the butterfly valve 16.

Figure 2:
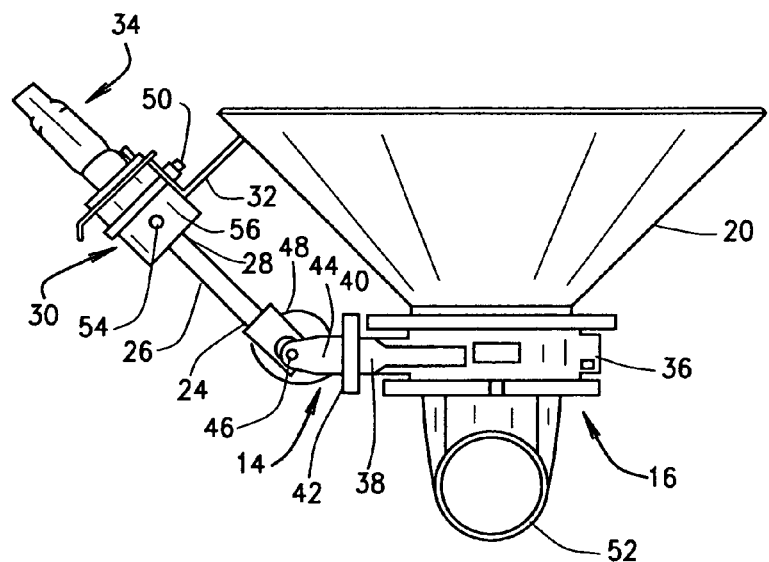
FIG. 2 is a side view of the multi-angle butterfly valve extension assembly constructed according to the present disclosure attached to butterfly valve housing.

FIG. 2 illustrates the multi-angle butterfly valve extension assembly 10 connected to a butterfly valve housing 36 which contains the valve stem 14 and the butterfly valve 16. The butterfly valve housing 36 has an extension portion 38 having a back end 40 and a flange or plate 42. The valve stem 14 may include a bracket 44 that receives a pin 46 with the pin 46 connecting the universal joint 12 to the valve stem 14. Operation of the universal joint 12 will turn the bracket 44 and the valve stem 14 to operate the butterfly valve 16. The extension portion 38 may be reinforced by use of internal bracing or diagonal bracing, both of which are not shown. The bracing adds structural reinforcement to the extension portion 38 and to the butterfly valve 16 to assure longevity of usage. It should be noted that the valve housing 36 and the extension portion 38 are normally located beneath the tank trailer 18 and are subject to flying rocks and other debris that the tank trailer 18 may encounter during transportation and reinforcement is desired. The butterfly valve housing 36 and the extension portion 38 will normally be molded from a metal, such as steel, but preferably aluminum. Aluminum is preferred due to it providing a more light weight butterfly valve 16 and being easier to operate.

The universal joint 12 has the first end 24 pinned or connected to the valve stem 14 by use of the bracket 44. The first end 24 is capable of a range of motion of 45° to position, pivot, or orientate the shaft 26 relative to the tank trailer 18. The universal joint 12 may have a rubber boot or bellows 48 covering the universal joint 12 to seal the joint 12 and to prevent any contamination of the joint 12. The rubber boot 48 also retains any lubrication used to lubricate the universal joint 12. The second end 28 of the shaft 26 is supported by the extension housing 30. The second end 28 extends out of the extension housing 30 and has a configuration that allows the handle 34 to be connected to the second end 28 so that the handle may be used to turn the shaft 26. The bracket 32 is shown being connected to the extension housing 30 by use of a bolt 50 and the bracket 32 may be welded or attached to the tank trailer 18. A pipe or conduit 52 allows for any material within the tank trailer 18 to be directed to another location once the butterfly valve 16 is operated. The extension housing 30 also has a grease fitting 54 on an exterior side 56 to inject grease into the extension housing 30 for maintenance and lubrication of the extension housing 30.

Figure 3:
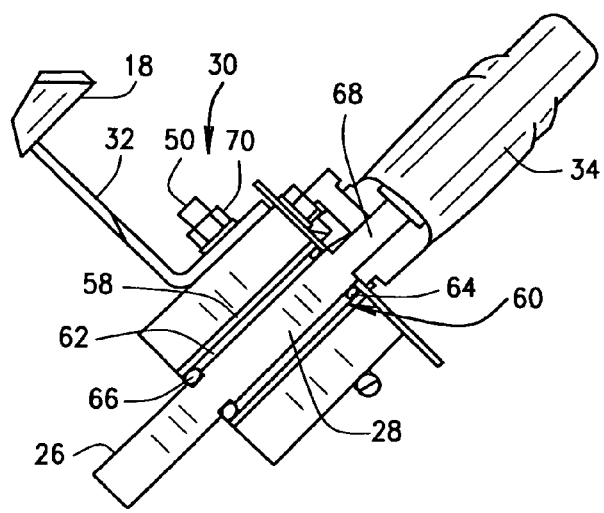
FIG. 3 is a partial cross-sectional view of a extension housing of the multi-angle butterfly valve extension assembly constructed according to the present disclosure.

With reference now to FIG. 3, a partial cross-sectional view of the extension housing 30 is shown. The extension housing 30 has an interior 58 having a pair of bushings 60 and 62 that support the shaft 26 within the extension housing 30. The bushings 60 and 62 also facilitate rotation or movement of the shaft 26. A top O-ring 64 and a bottom O-ring 66 are provided within the extension housing 28 to prevent any contamination from entering into the extension housing 28. The O-rings 64 and 66 also seal in any grease or lubricant in the interior 58 of the extension housing 30. The second end 28 of the shaft 26 extends out of the extension housing 30 and the handle 34 is placed on or connected to the second end 28. Further, the second end 28 may have a socket end 68. The bracket 32 is used to hold the extension housing 30 in place and at the desired angle relative to the tank trailer 18. The bracket 34 is connected to the extension housing 30 by use of the bolt 50 and a nut 70 may be positioned on the bolt 50.

Figure 4:
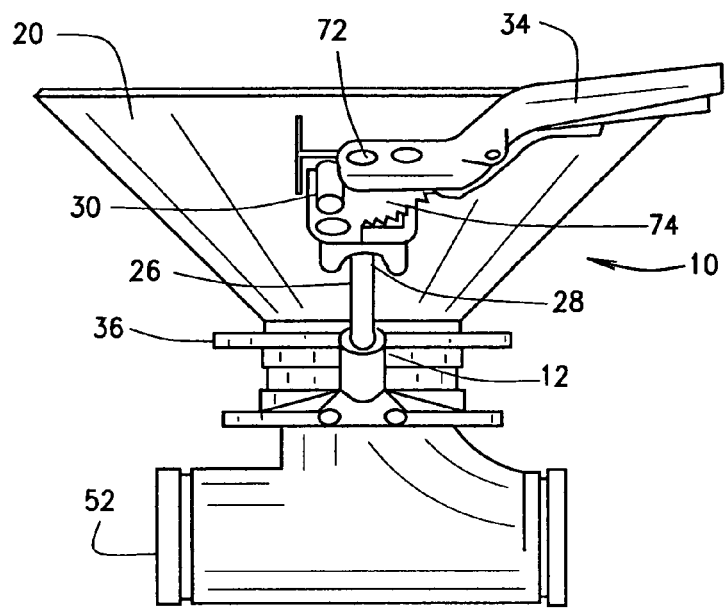
FIG. 4 is a front perspective view of the multi-angle butterfly valve extension assembly constructed according to the present disclosure having a handle positioned thereon for operation of the extension assembly.

FIG. 4 illustrates a front perspective view of the multi-angle butterfly valve extension assembly 10. The extension assembly 10 is shown having the extension housing 30 having the handle 34 placed on the second end 28 of the shaft 26. The handle 34 has a socket opening 72 that is configured to receive the socket end 68 of the second end 28. For example, if the socket end 68 has a rectangular shape, the opening 72 will be a complimentary rectangular shape so that the handle 34 may be placed on the second end 28. In this manner, the handle 34 may be moved or rotated to actuate the butterfly valve 16. The second end 26 may also have a lock lever plate 74.

The multi-angle butterfly valve extension assembly 10 is further illustrated having the universal joint 14 connected to the shaft 24 at the first end 22. The second end 26 of the shaft 24 is supported by the extension housing 28. The universal joint 14 may be pivoted to an angle that allows the shaft 24 to extend up along the tank trailer 18. This places the extension assembly 10 at a convenient angle for an operator to use the extension assembly 10 to operate the butterfly valve 16 by use of the handle 34. Once the extension assembly 10 is operated, the butterfly valve 16 may be opened to unload product into the pipe 52. In this particular configuration, product will flow from left to right to a location away from the tank trailer 18.

Figure 5:
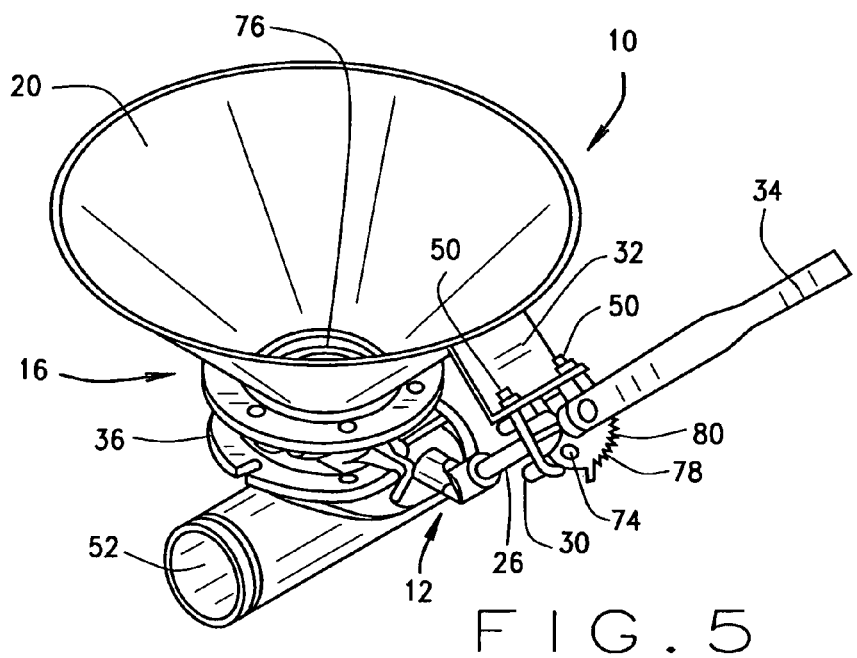
FIG. 5 is a side perspective view of the multi-angle butterfly valve extension assembly having a handle thereon for operation of the extension assembly.

With reference now to FIG. 5, an interior view of the hopper 20 is depicted having a valve plate 76 that pivots open or closed as part of the butterfly valve 16. Although not shown, the butterfly valve 16 may include other components such as a gasket and another stem. As can be appreciated, any material within the tank trailer 18 is funneled through the hopper 20 and the butterfly valve 16 to be discharged into the pipe 52. The lock lever plate 74 has a plurality of lock lever notches 78 with intervening teeth 80 there between. The handle 34 may include structure such as a spring steel lever tip (not shown) that may interact with the notches 78 to further facilitate operation of the extension assembly 10. Optionally, the lock lever plate 74 may include a ratcheting mechanism, including a ratcheting reversal feature, to prevent the extension assembly from prematurely or accidentally reversing operation of the butterfly valve 16. The extension assembly 10 is shown having the universal joint 12, the shaft 26, and the extension housing 30. In this particular view, the boot 48 has been removed to show the universal joint 12. The bracket 32 uses bolts 50 to connect the extension housing 30 to the bracket 32. As has been previously indicated, once the handle 34 is operated, the valve plate 76 of the butterfly valve 16 will be opened to unload product into the pipe 52. Product or material will be directed out of the hopper 20 and the butterfly valve 16 to flow through the pipe 52 from left to right, in this particular construction, to a location away from the tank trailer 18.

From all that has been said, it will be clear that there has thus been shown and described herein a multi-angle butterfly valve extension assembly. It will become apparent to those skilled in the art, however, that many changes, modifications, variations, and other uses and applications of the subject multi-angle butterfly valve extension assembly are possible and contemplated. All changes, modifications, variations, and other uses and applications which do not depart from the spirit and scope of the disclosure are deemed to be covered by the disclosure, which is limited only by the claims which follow.

I claim:

1. A multi-angle butterfly valve extension assembly for use in conjunction with a hopper tee positioned on the bottom of a bulk commodity tank, of a tank trailer, railroad hopper car, or a storage container for use for unloading bulk commodities; comprising:

a butterfly valve having a valve housing and a stem extending from one side thereof, said valve stem having an extending portion, a universal joint attaching to the extending portion of said butterfly valve;

a shaft having a first end and a second end, said first end of said shaft connected to said universal joint;

an extension housing, said second end of said shaft supported for pivotal movement by said extension housing, with said second end of said shaft extending further out of said extension housing, said second end of said shaft having a configuration for accepting a handle, and with said handle assisting and moving the shaft second end, the shaft, the shaft first end, and said universal joint to open or close said butterfly valve, wherein said shaft through manipulation by said handle capable of pivoting said shaft and its connected universal joint through an angle between about 0° to 45° with respect to the axis of said butterfly valve to open or close said butterfly valve;

a bracket, said bracket connecting with said extension housing, for allowing the pivotal movement of said shaft therethrough, said bracket provided for affixing to a bulk commodity tank to support said valve extension assembly in place upon a bulk commodity tank; and whereby any operator of said valve extension assembly does not need to locate under the bulk commodity tank to open and close the associated butterfly valve through manipulation of said butterfly valve extension and its exposed handle.

2. The multi-angle butterfly valve extension assembly of claim 1 further comprising a boot for covering the universal joint.

3. The multi-angle butterfly valve extension assembly of claim 1 wherein the extension housing comprises a pair of bushings for facilitating rotation of the shaft.

4. The multi-angle butterfly valve extension assembly of claim 3 wherein the extension housing comprises a pair of O-rings for preventing contaminants from entering into the extension housing.

5. The multi-angle butterfly valve extension assembly of claim 4 wherein the extension housing comprises a grease fitting for allowing grease to be pumped into the extension housing for maintenance and lubrication.

* * * * *